(12) United States Patent
Gellert et al.

(10) Patent No.: US 7,198,740 B2
(45) Date of Patent: Apr. 3, 2007

(54) LATERAL GATING INJECTION MOLDING APPARATUS

(75) Inventors: Jobst Gellert, Oakville (CA); Hans Guenther, Georgetown (CA); Denis Babin, Georgetown (CA); George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 384 days.

(21) Appl. No.: 10/736,624

(22) Filed: Dec. 17, 2003

(65) Prior Publication Data

US 2004/0151799 A1 Aug. 5, 2004

Related U.S. Application Data

(60) Provisional application No. 60/434,653, filed on Dec. 20, 2002.

(51) Int. Cl.
  *B29C 45/28* (2006.01)
  *B29C 45/30* (2006.01)
  *B29C 45/72* (2006.01)
  *B29C 45/80* (2006.01)

(52) U.S. Cl. .......... 264/40.7; 264/328.1; 425/562; 425/564

(58) Field of Classification Search .......... 264/40.7
See application file for complete search history.

(56) References Cited

U.S. PATENT DOCUMENTS

| | | | | |
|---|---|---|---|---|
| 2,111,857 A | * | 3/1938 | Jeffery | 425/548 |
| 2,456,423 A | * | 12/1948 | Jobst | 425/146 |
| 4,108,956 A | * | 8/1978 | Lee | 264/161 |
| 5,071,340 A | | 12/1991 | LaBianca | |
| 5,106,291 A | | 4/1992 | Gellert | |
| 5,208,052 A | | 5/1993 | Schmidt et al. | |
| 5,554,395 A | | 9/1996 | Hume et al. | |
| 5,879,727 A | | 3/1999 | Puri | |

FOREIGN PATENT DOCUMENTS

| | | |
|---|---|---|
| JP | 6143362 | 5/1994 |
| JP | 7276437 | 10/1995 |

(Continued)

*Primary Examiner*—Christina Johnson
*Assistant Examiner*—Monica A Huson
(74) *Attorney, Agent, or Firm*—Medler Ferro PLLC

(57) ABSTRACT

The invention relates to an injection molding apparatus including a mold block, a nozzle, a gating system and a slug heater. The mold block defines a mold cavity having a mold cavity inlet. The nozzle has a nozzle inlet. The nozzle inlet is fluidically connectable downstream from a melt source. The nozzle inlet is upstream from the mold cavity inlet. A melt flow passage extends from the nozzle inlet to the mold cavity inlet. The gating system includes a valve pin and an actuator. The valve pin is movable between an open position wherein melt flow is permitted into the mold cavity, and a closed position wherein the valve pin blocks the melt flow passage to prevent melt flow into the mold cavity. The actuator is operatively connected to the valve pin to move the valve pin between the open and closed positions. At least one of the mold block and the valve pin includes a cooling system for selectively solidifying melt to form a slug immediately upstream from the valve pin when the valve pin is in the closed position. In use the slug blocks the melt flow passage to substantially prevent melt leakage past the slug when the valve pin is positioned away from the slug.

8 Claims, 16 Drawing Sheets

FOREIGN PATENT DOCUMENTS

| | | |
|---|---|---|
| JP | 10156897 | 6/1998 |
| JP | 11090963 | 4/1999 |
| JP | 11314148 | 11/1999 |
| JP | 2001212660 | 3/2001 |
| JP | 2002036306 | 2/2002 |
| JP | 2002079550 | 3/2002 |
| JP | 2002347086 | 12/2002 |
| WO | WO 98/19846 | 5/1998 |

\* cited by examiner

LATERAL GATING INJECTION MOLDING APPARATUS

FIELD OF THE INVENTION

This invention relates to an injection molding apparatus, and more particularly to an injection molding apparatus having a combined thermal gating and valve gating system.

BACKGROUND OF THE INVENTION

In many injection molding operations, there is a need to utilize a movable valve pin to open and close a gate into a mold cavity in order to control the melt flow into the mold cavity. In some cases, however, the material that is being molded can be corrosive or abrasive and can degrade the valve pin as the material flows thereby. As the valve pin degrades, its ability to seal the gate is gradually and progressively reduced, until an effective seal is unable to be made. The injection molding apparatus must then be stopped and the valve pin must be repaired or replaced, which can be an expensive and time consuming procedure. For such operations, the valve pins can have an undesirably short operating life.

An example of the above described situation occurs in metal injection molding, for magnesium injection molding in particular. Due to the relatively high flowability of magnesium and due to its corrosiveness, leakage or drool can occur at the gate relatively quickly as a result of abrasion of the valve pin.

Thus, there is a need for a new gating system for an injection molding apparatus, that provide improved reliability and longer operating life for the valve pin.

SUMMARY OF THE INVENTION

In a first aspect the invention is directed to an injection molding apparatus including a mold block, a nozzle, a gating system and a slug heater. The mold block defines a mold cavity having a mold cavity inlet. The nozzle has a nozzle inlet. The nozzle inlet is fluidically connectable downstream from a melt source. The nozzle inlet is upstream from the mold cavity inlet. A melt flow passage extends from the nozzle inlet to the mold cavity inlet. A melt flow passage extends from the nozzle inlet to the mold cavity inlet. The gating system includes a valve pin and an actuator. The valve pin is movable between an open position wherein melt flow is permitted into the mold cavity, and a closed position wherein the valve pin blocks the melt flow passage to prevent melt flow into the mold cavity. The actuator is operatively connected to the valve pin to move the valve pin between the open and closed positions. At least one of the mold block and the valve pin includes a cooling system for selectively solidifying melt to form a slug immediately upstream from the valve pin when the valve pin is in the closed position. In use the slug blocks the melt flow passage to substantially prevent melt leakage past the slug when the valve pin is positioned away from the slug.

In a second aspect, the invention is directed to a method for controlling melt flow in an injection molding apparatus, the injection molding apparatus including a mold block, a manifold, and at least one nozzle, the mold block defining a mold cavity having a gate passage thereto, the at least one nozzle defining a nozzle melt channel for transferring melt from a melt source to the gate passage, the method comprising:

providing at the gate passage, a valve pin that is movable between an open position wherein the valve pin is at least partially removed from the gate passage to permit melt flow through the gate passage, to a closed position wherein the valve pin cooperates with the gate passage to inhibit melt flow therebetween, wherein the valve pin is positioned outside the nozzle melt channel in both the open and closed positions and is positioned away from the mold cavity in both the open and closed positions; and moving the valve pin between the open position and the closed position to control the flow of melt into the mold cavity.

In a third aspect the invention is directed to an injection molding apparatus including a mold block at least one nozzle and at least one gating system. The mold block defines a mold cavity having a gate passage thereto. The at least one nozzle defines a nozzle melt channel. The nozzle is positionable so that the nozzle melt channel is downstream from a melt source and is upstream from the gate passage. The at least one gating system includes a valve pin and an actuator. The valve pin is moveable between an open position wherein the valve pin is at least partially removed from the gate passage to permit melt flow into the mold cavity, and a closed position wherein the valve pin cooperates with the gate passage to prevent melt flow into the mold cavity. The actuator is operatively connected to the valve pin to move the valve pin between the open and closed positions. The valve pin is positioned outside of the nozzle melt channel in both the open and closed positioned. The valve pin is positioned in the mold block. The valve pin is generally opposed to and is moveable coaxially with the nozzle melt channel.

In a fourth aspect the invention is directed to an injection molding apparatus including a mold block, a nozzle and a gating system. The mold block defines a plurality of mold cavities and a plurality of gate passages thereto, wherein the plurality of gate passages are in fluid communication with a common inlet portion. The nozzle defines a nozzle melt channel. A nozzle is positionable so that the nozzle melt channel is downstream from a melt source and is upstream from the common inlet portion. The gating system includes a valve pin and an actuator. The valve pin is moveable between an open position wherein the valve pin is at least partially removed from the common inlet portion to permit melt flow into the plurality of mold cavities, and a closed position wherein the valve pin cooperates with the common inlet portion to prevent melt flow into the plurality of mold cavities. The valve pin is positioned outside of the nozzle melt channel in both the open and closed positions. The actuator is operatively connected to the valve pin to move the valve pin between the open and closed positions.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENTS

Figure 1:
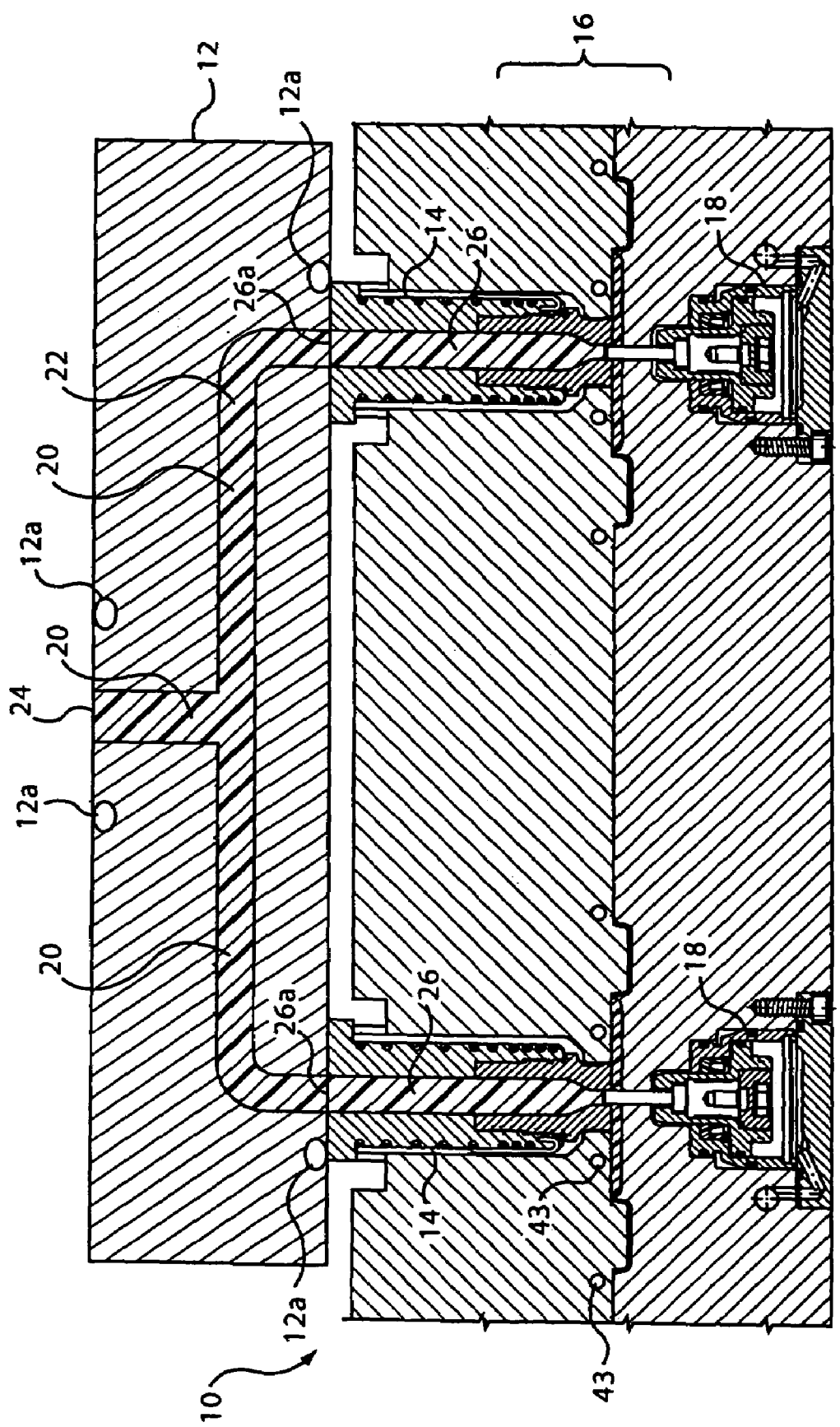
FIG. 1 is a sectional side view of an injection molding apparatus having a gating system in accordance with a first embodiment of the present invention.

Reference is made to FIG. 1, which shows an injection molding apparatus 10 in accordance with a first embodiment of the present invention. The injection molding apparatus 10 includes a manifold 12, a plurality of nozzles 14, a mold block 16 and a plurality of gating systems 18.

The manifold 12 defines a plurality of runners 20, which receive melt 22 from a melt source (not shown), through a main runner inlet 24, and which transfer the melt 22 to the nozzles 14. The injection molding apparatus 10 may alternatively have more or fewer nozzles 14 than the amount shown in FIG. 1.

The melt 22 may be any flowable injection molding material. For example, the melt 22 may be a metal, such as, for example, magnesium or a magnesium alloy. Magnesium has been found to damage components that are positioned in a runner or other melt channel as it flows therepast, due to its corrosiveness.

Each nozzle 14 defines a nozzle melt channel 26, which has a nozzle inlet 26a, which is in communication with a runner 20 from the manifold 12. The nozzle 14 transfers melt 22 from the manifold 12 to the mold block 16. Each nozzle 14 may include a heater 27 for heating melt 22 in the nozzle melt channel 26. It is alternatively possible for the nozzle 14 to be heated by other means, such as by conducting heat into the nozzle 14 from the manifold heater, which is shown at 12a.

Figure 2A:
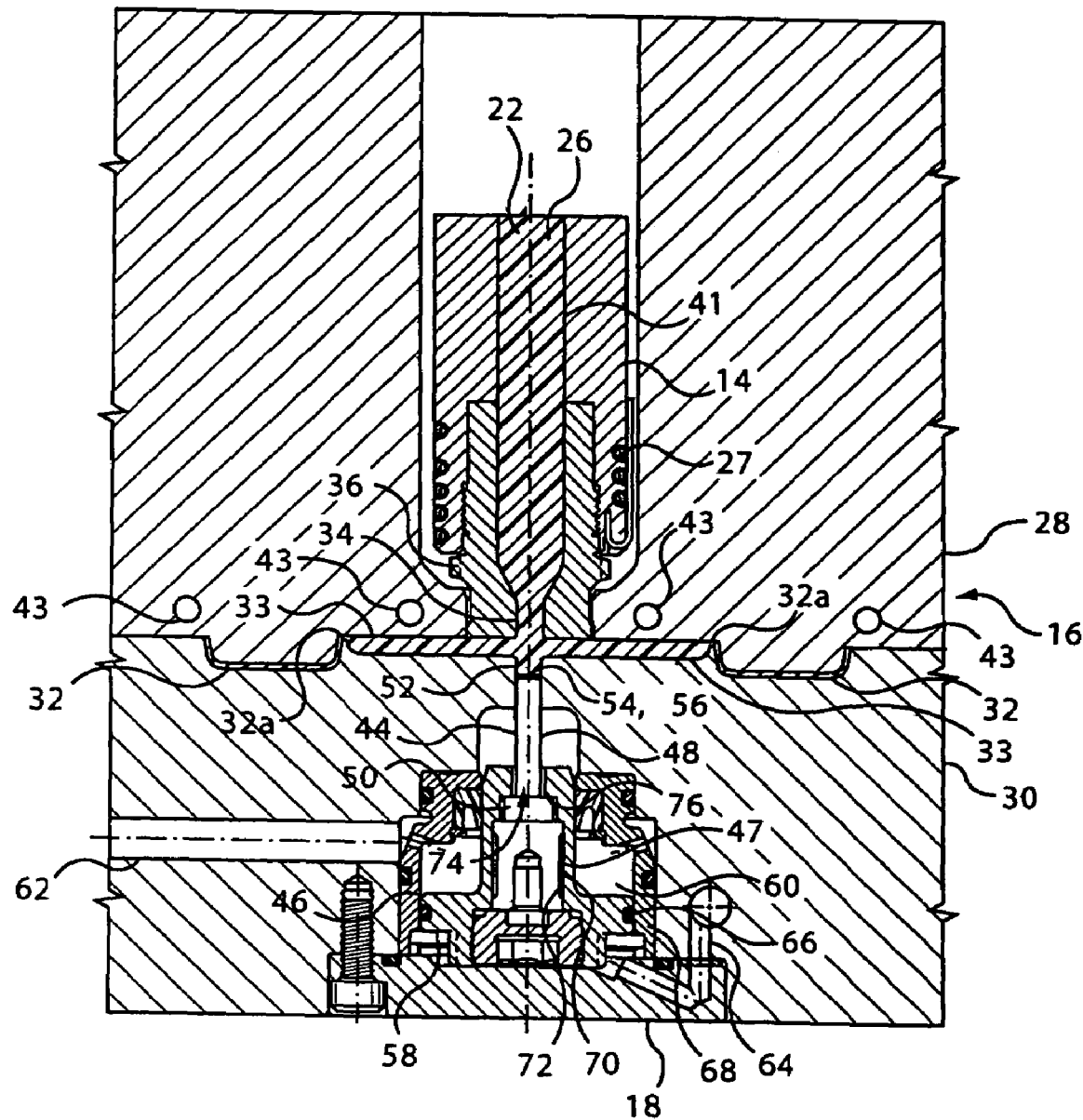
FIG. 2a is a sectional side view of the gating system shown in FIG. 1, wherein the gating system has a valve pin shown in an open position.

Reference is made to FIG. 2a. The mold block 16 may be made up of a first mold plate 28 and a second mold plate 30, which together define a plurality of mold cavities 32 each having an inlet 32a thereto. Each mold cavity 32 may have an optional gate passage 33 leading to the inlet 32a. Each gate passage 33 may be positioned at least in part along the parting line (ie. the mating surfaces) between the first and second mold plates 28 and 30. As shown in FIG. 2a, two or more gate passages 33 may share a common inlet portion 34, which receives melt from one of the nozzles 14. It is alternatively possible for each nozzle 14 to feed a single gate passage 33 (see FIG. 9), instead of feeding two or more gate passages 33.

Each common inlet portion 34 may be defined in a gate insert 36, which is connected to the first mold plate 28 and which may also be connected to the nozzle 14. The gate insert 36 may also define a portion of the nozzle melt channel 26 immediately upstream of the common inlet portion 34. Alternatively, the common inlet portion 34 may be defined directly in the first mold plate 28, instead of being defined in a gate insert, as shown in FIG. 10, which is described in further detail further below.

The nozzle 14, the gate insert 36 and the mold plates 28 and 30 cooperate to define a melt flow passage 41 extending from the nozzle inlet 26a (FIG. 1) to the inlets 32a to the mold cavities 32. The melt flow passage 41 may consist of the nozzle melt channel 26, the common inlet portion 34 and the gate passages 33.

Figure 2B:
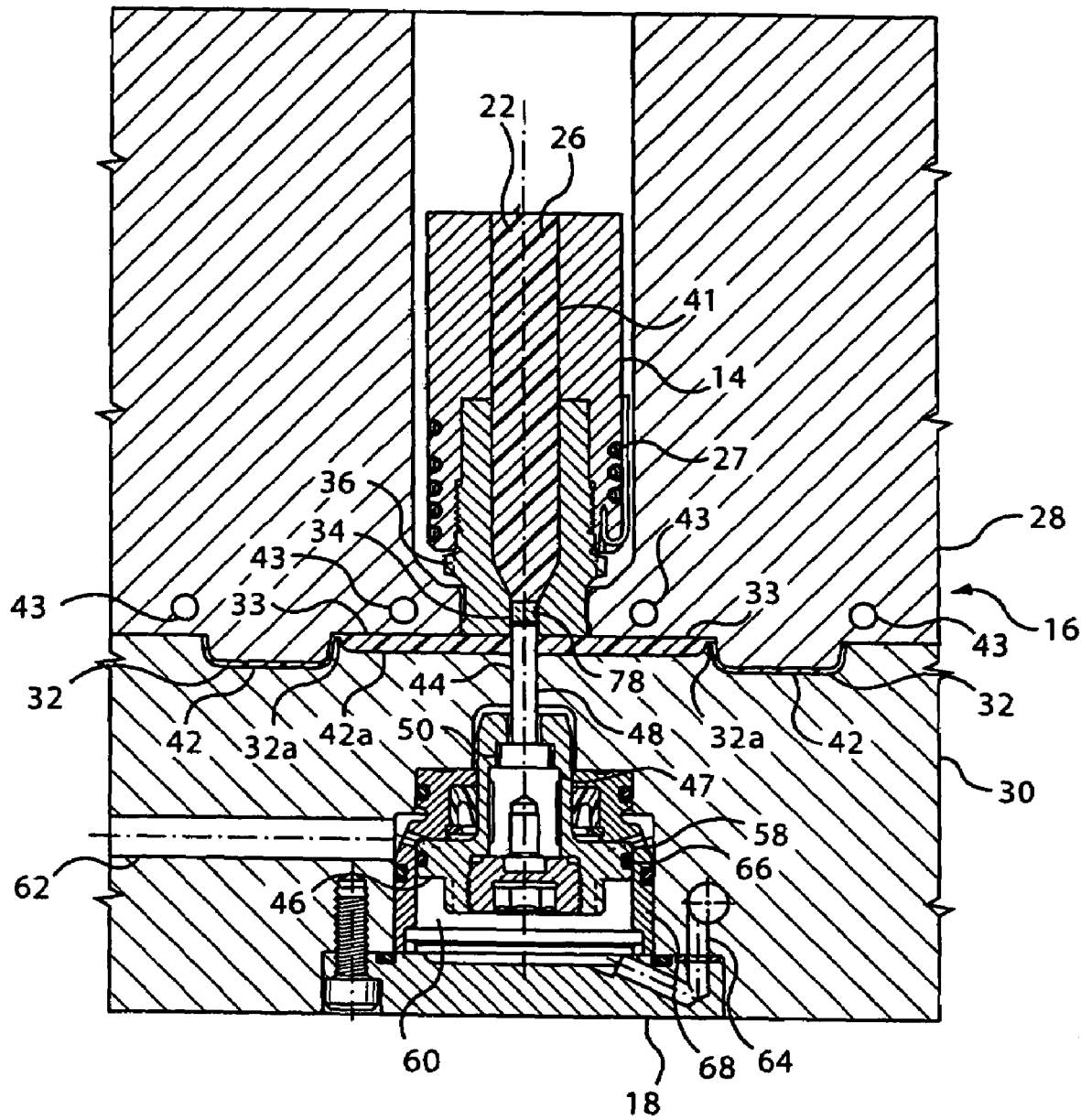
FIG. 2b is a sectional side view of the injection molding apparatus shown in FIG. 2a, showing the valve pin in a closed position.
Figure 2C:
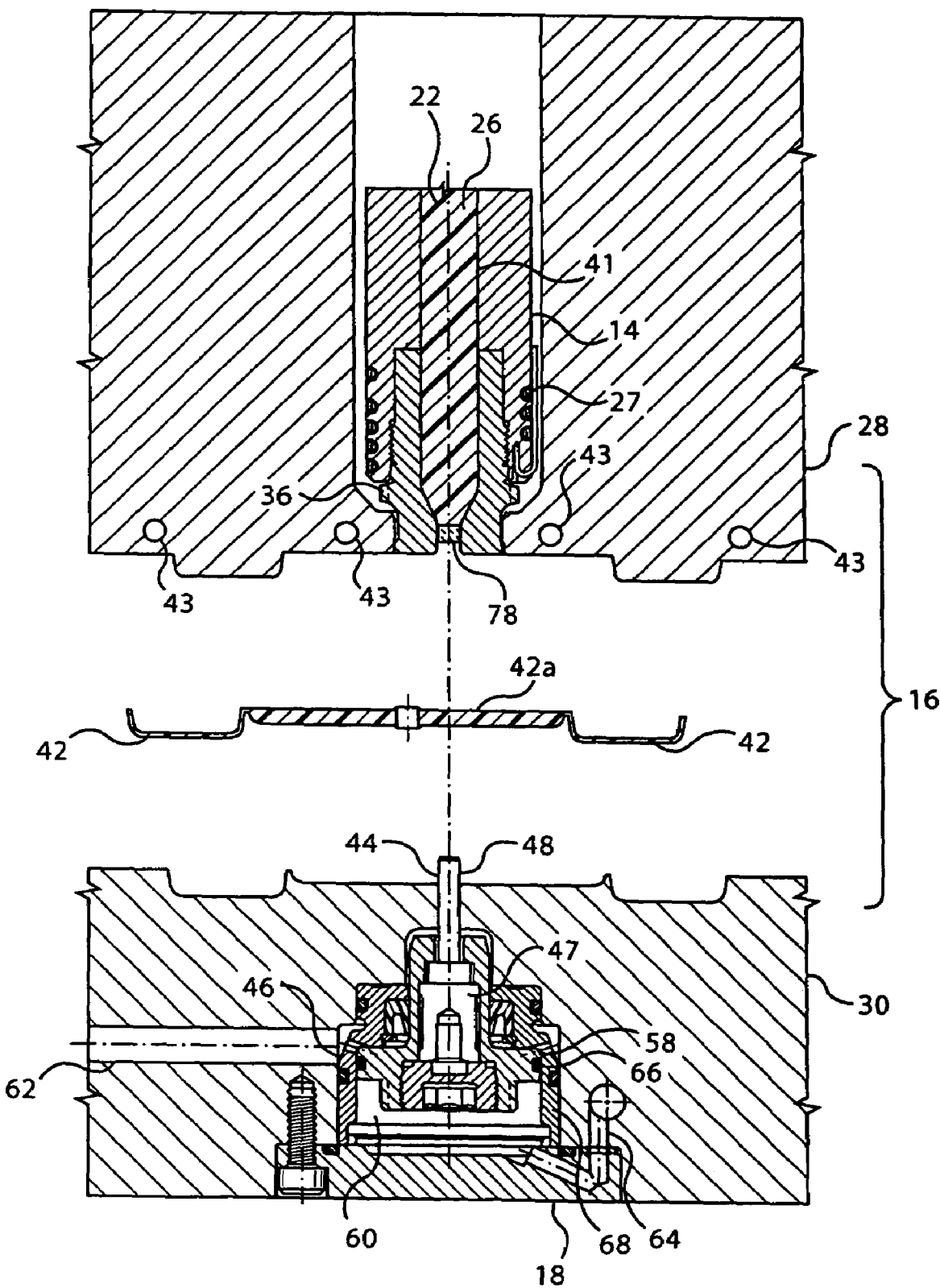
FIG. 2c is a sectional side view of the injection molding apparatus shown in FIG. 2a, showing a mold plate in an ejection position.

The first mold plate 28 may be fixed in place during operation of the injection molding apparatus 10. The second mold plate 30 may move between a mold-closed position, as shown in FIG. 2a, to an ejection position, as shown in FIG. 2c. In the mold-closed position (FIG. 2a), the second mold plate 30 mates with the first mold plate 28 to define the mold cavities 32 during the molding phase of an injection molding cycle. In the ejection position (FIG. 2c), the second mold plate 30 is spaced sufficiently far from the first mold plate 28, so that molded parts, which are shown at 42, may be ejected from the mold cavities 32, along with any extra solidified melt, which is shown at 42a, from the gate passages 33. The second mold plate 30 may be moved between the molding and ejection positions by any suitable means, such as by hydraulic rams (not shown). The molded parts 42 may then be separated from the extra solidified melt 42a by any suitable means.

Cooling channels 43 may be included in both the first and second mold plates 28 and 30 for cooling and solidifying the melt 22 in the mold cavity 32 and the gate passage 33.

The gating system 18 includes a valve pin 44, an actuator 46 and an optional retainer 47. The gating system 18 permits the closure of the gate passages 33 by the valve pin 44, without the valve pin 44 being exposed to the flow of melt through the nozzle melt channel 26.

The valve pin 44 includes a valve pin body 48 and may optionally include a valve pin head 50. The valve pin 44 may be made from any suitable material, such as tool steel. The valve pin 44 may be movable in a valve pin channel 52 between an open position, as shown in FIG. 2a to a closed position as shown in FIG. 2b. In the open position (see FIG. 2a) the valve pin 44 is positioned so as to be at least partially removed from the gate passage 33 to permit melt flow into the mold cavity 32. The valve pin 44 may be positioned flush with the wall of the gat passage 33, as shown in FIG. 2a. Alternatively, the valve pin 44 may extend partially into the gate passage 33, without closing off the gate passage 33. In the open position, the valve pin 44 is substantially removed from the melt flow passage and thereby avoids contact with the melt 22. By avoiding contact with the melt 22 in this way, wear on the valve pin 44 is reduced.

In the closed position (see FIG. 2b) the valve pin 44 is positioned in the gate passages 33 (eg. in the common inlet portion 34) thereby blocking the melt flow passage to prevent melt flow into the mold cavities 32.

The valve pin body 48 has an end face 54, which may include an abrasion resistant coating 56, such as ceramic, to inhibit abrasion or wear due to contact with the melt 22.

The valve pin head 50 may be used to provide a gripping surface permitting the valve pin 44 to be connected to the actuator 46. The valve pin head 50 may have any suitable shape, such as, for example, a disc shape having a diameter that is larger than that of the valve pin body 48.

The valve pin channel 52 may be defined in any suitable component of the injection molding apparatus 10. For example, the valve pin channel 52 may be defined in the second mold plate 30. The valve pin 44 cooperates with the valve pin channel 52 to prevent or at least inhibit the leakage of melt 22 therebetween.

The valve pin channel 52 is a separate channel from the nozzle melt channel 26. By having the valve pin 44 move in the valve pin channel 52 instead of the nozzle melt channel 26, the valve pin 44 is substantially unexposed to the melt 22, thereby extending the life of the valve pin 44.

The actuator 46 is operatively connected to the valve pin 44. The actuator 46 drives the movement of the valve pin 44 between the open and closed positions. The actuator 46 may be any suitable type of actuator. For example, the actuator 46 may include a piston 58, which is movable within a chamber 60, by means of an actuating fluid. The actuating fluid may be, for example, a hydraulic oil. A first fluid conduit 62 and a second fluid conduit 64 may be provided connecting a fluid pressure source (not shown) to the chamber 60 on either side of the piston 58. A seal 66 may be provided on the outer edge of the piston 58 to prevent leakage of the actuation fluid between the piston 58 and the chamber housing which is shown at 68, from one side of the piston 58 to the other side.

The valve pin 44 and the actuator 46 may be removably connected to each other, by means of, for example, the optional retainer 47. By providing a removable connection between the valve pin 44 and the actuator 46, either one may be replaced without necessitating the replacement of the other.

The retainer 47 may connect the valve pin 44 to the actuator 46 in any suitable way. For example, the retainer 47 may include a first threaded surface 70 which mates with a corresponding second threaded surface 72 on the piston 58. The piston 58 may include a pass-through 74 with an internal shoulder 76. The valve pin body 48 may pass through the pass-through 74 and may be retained in place by the pinning of the valve pin head 50 against the internal shoulder 76 by the retainer 47.

The injection molding cycle is described as follows. The valve pin 44 may be retained in the open position shown in FIG. 2a until the mold cavity 32 is full. When the mold cavity 32 is sufficiently packed with melt 22, the valve pin 44 is moved to the closed position, which is shown in FIG. 2b. A flow of coolant may be initiated in the cooling channels 43, to cool and solidify the melt 22 in the mold cavity 32. It will be noted that the movement of the valve pin 44 may occur before or after the flow of coolant is initiated in the cooling channels 43.

In the closed position, the valve pin 44 is positioned in the common inlet portion 34 and cooperates therewith to prevent melt flow into the mold cavities 32. The flow of coolant causes the melt 22 in the mold cavity 32 to cool and solidify. A slug of melt 22 which is shown at 78 and which is positioned immediately upstream of the valve pin 44, is also caused to cool and solidify by the flow of coolant. The solidification of the slug 78 causes it to firmly attach to the common inlet portion 34.

Once the slug 78 is solidified and the melt 22 in the mold cavities 32 is solidified to form the molded parts 42, the second mold plate 30 is moved away from the first mold plate 28 into the ejection position as shown in FIG. 2c. Once the second mold plate 30 is in the ejection position, the molded parts 42 may be ejected from the mold cavities 32, along with the solidified melt 42a from the gate passages 33. The molded parts 42 and the extra solidified melt 42a may drop from the mold cavities 32 into, for example, a collection vessel (not shown) or a conveyor (not shown) and may be separated from each other by any suitable means.

In the ejection position, shown in FIG. 2c, the valve pin 44 is spaced from the gate passages 33, however, the solidified slug 78 remains fixed in position in the common inlet portion 34 to prevents melt 22 from leaking therepast and drooling out of the common inlet portion 34.

Figure 2D:
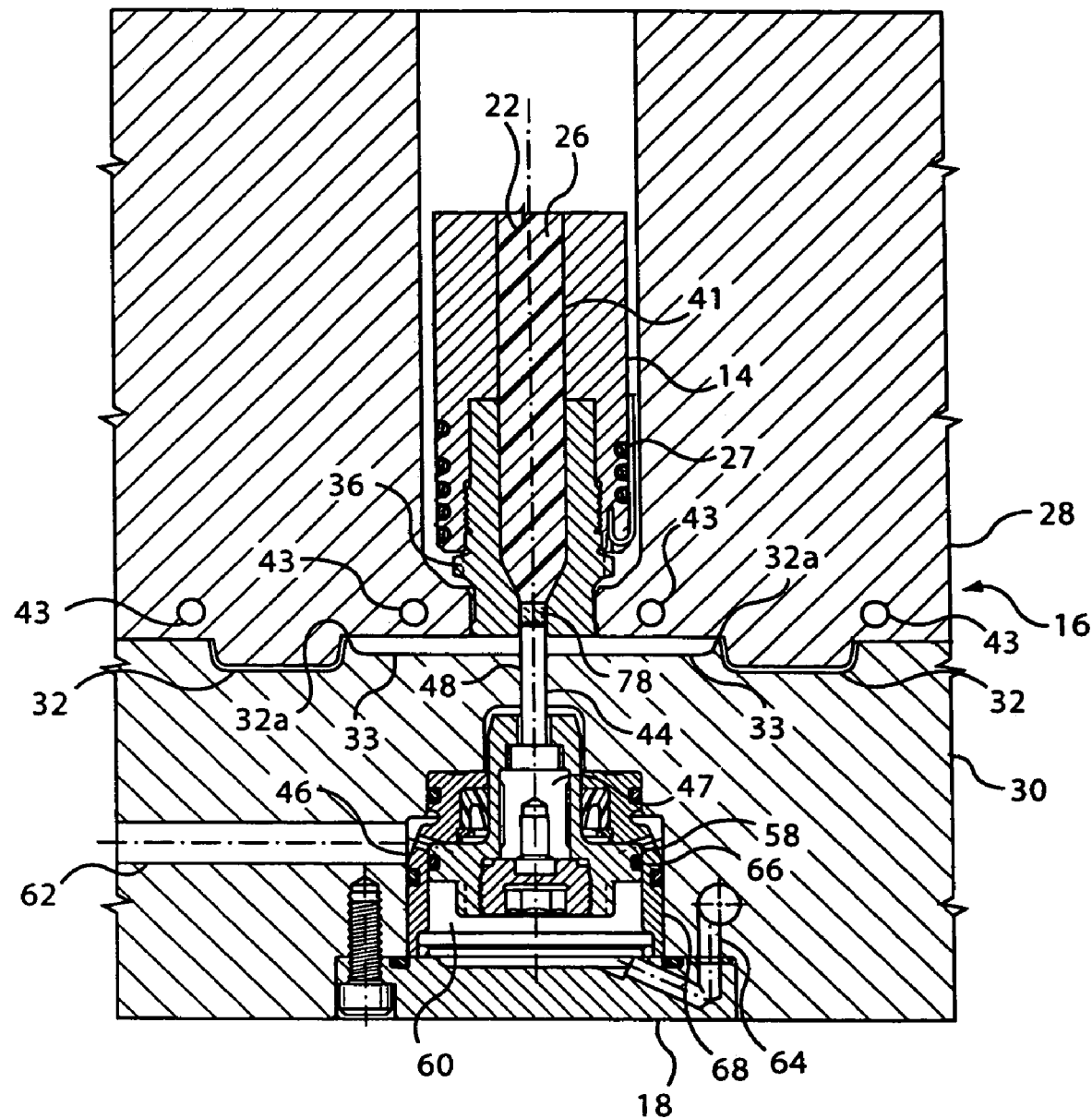
FIG. 2d is a sectional side view of the injection molding apparatus shown in FIG. 2a, showing the mold plate in a mold-closed position.

Once the molded parts 42 are ejected from the mold cavities 32, the second mold plate 30 is moved from the ejection position, shown in FIG. 2c back to the mold-closed position, shown in FIG. 2d. In the mold-closed position the valve pin 44 is in the closed position.

The coolant flow in the cooling channels 43 is stopped, and the slug 78 is heated by the heater 27. In this way, the nozzle heater 27 is also a slug heater that is connected thermally to the slug 78. In other words, the nozzle heater 27 is configured to provide sufficient heat to the slug 78 to melt the slug 78. The heating of the slug 78 causes it to liquefy. With the valve pin 44 in the closed position, the slug 78 may be liquefied to any desired degree, while the valve pin 44 prevents melt 22 from entering the mold cavities 32. Preferably, the slug 78 is substantially entirely liquefied before the valve pin 44 is retracted into the open position, shown in FIG. 2a, for several reasons, which follow.

If a solid portion of the slug 78 entered the mold cavity 32, it could prevent melt 22 from reaching certain portions of the mold cavity 32. Furthermore, the solid portion of the slug 78 could cause visible weld lines or other blemishes on one of the molded parts 42. Also, the solid portion of the slug 78 could weaken the molded part 42 because of poor strength between the solid slug portion and immediately surrounding solidified melt. By liquefying the entire slug 78, these risks are eliminated.

When the valve pin 44 is retracted into the open position, the melt 22 flows into the mold cavity 32 for another injection molding cycle.

Figure 3:
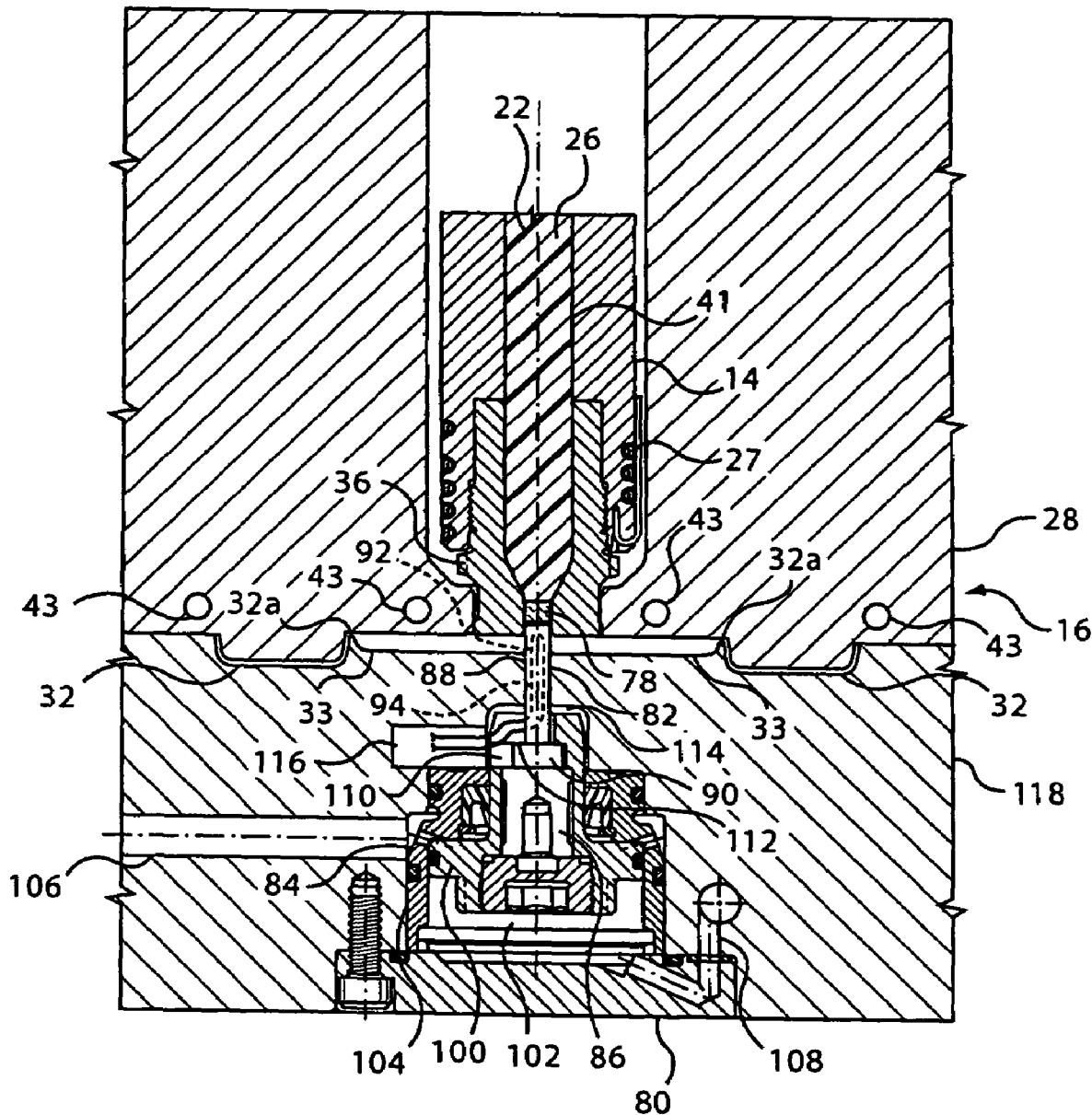
FIG. 3 is an alternative gating system for use with the present invention.

Reference is made to FIG. 3, which shows a gating system 80 which may be used with the present invention as an alternative to the gating system 18 (FIG. 2a). The gating system 80 includes a valve pin 82, an actuator 84 and an optional retainer 86. The valve pin 82 may be similar to the valve pin 44 (FIG. 2a), and includes a valve pin body 88 and may include an optional valve pin head 90, which may be similar to the valve pin body 48 and the valve pin head 50 (FIG. 2a). A difference between the valve pin 82 and the valve pin 44 (FIG. 2a) is that the valve pin 82 includes a heating element 92 embedded therein. The heating element 92 may include, for example, a resistive wire 94 that is connected to a power source (not shown).

Figure 4A:
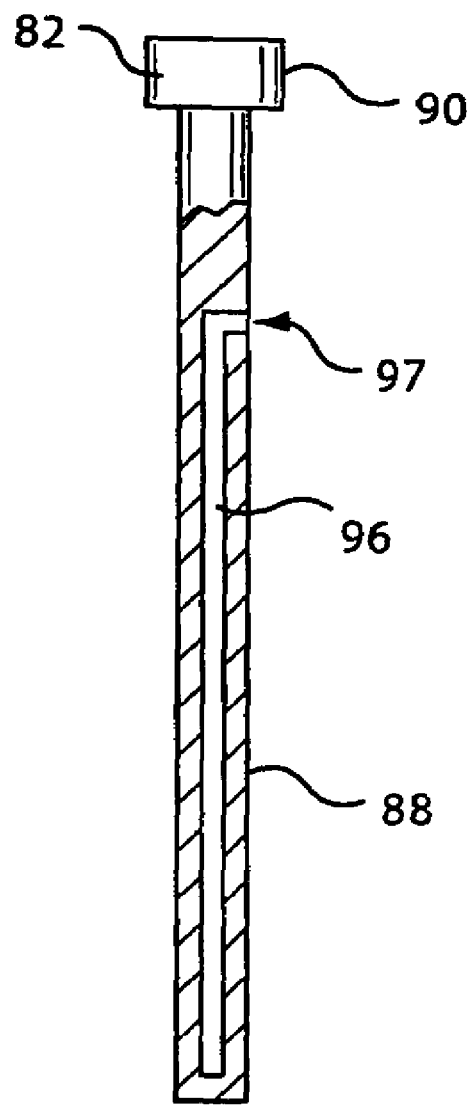
FIGS. 4a and 4b are sectional side views illustrating different stages of manufacture of a valve pin shown in FIG. 3.
Figure 4B:
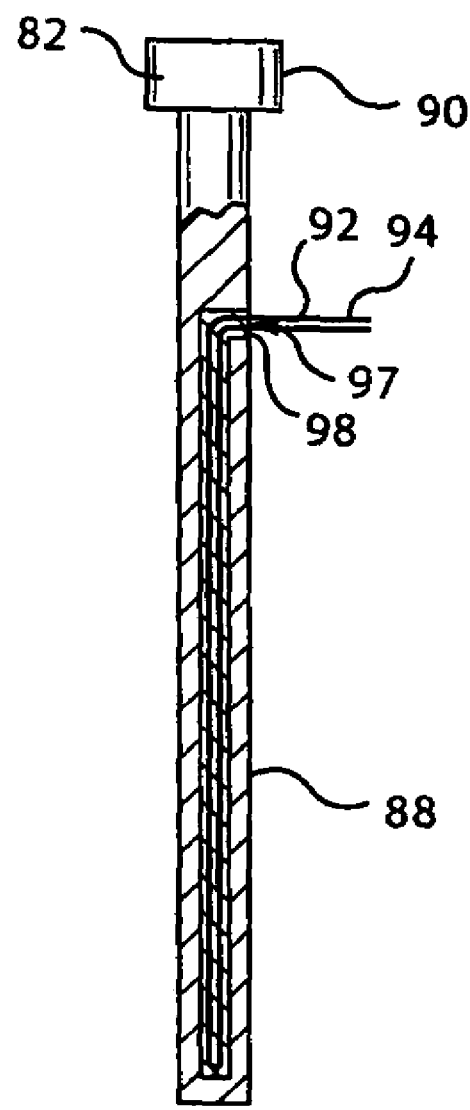

Reference is made to FIGS. 4a and 4b. The heating element 92 may be incorporated into the valve pin 82 in any suitable way. For example, in the case where the heating element 92 includes the resistive wire 94, the following procedure may be used to get the heating element 92 into the valve pin 82. The valve pin 82 may be hollowed out, leaving an inner volume 96 (FIG. 4a) that has an aperture 97. The resistive wire 94 is inserted into the inner volume 96 through the aperture 97. The inner volume 96 may be filled with a conductor material 98 (FIG. 4b), such as a suitably thermally conductive metal, to facilitate heat transfer from the resistive wire 94 to the exterior of the valve pin 82. The conductor material 98 may be molten when it is introduced into the inner volume 96, and then cools and solidifies around the resistive wire 94. Thus configured, the valve pin 82 includes a valve pin heater. It will be appreciated that other heated valve pins may be used instead of the valve pin 82. For example, U.S. Pat. No. 5,106,291 (Gellert) discloses a heated valve pin, which may alternatively be used instead of the valve pin 82. The valve pin heater may act as the slug heater either alone or in conjunction with the nozzle heater 27 (FIGS. 2a–2d). The valve pin heater is thermally connected to the slug 78 when the mold block 20 is in the mold-closed position and when the valve pin 82 is in the closed position and is thus in direct contact with the slug, as shown in FIG. 2d.

Referring to FIG. 3, the actuator 84 is operatively connected to the valve pin 82. The actuator 84 may be any suitable type of actuator, such as a hydraulically actuated piston 100 that is movable by means of an actuating fluid, in a chamber 102, which is defined by a housing 104. The actuating fluid may be, for example, air. A first fluid conduit 106 and a second fluid conduit 108 may be provided connecting a fluid pressure source (not shown) to the chamber 102 on either side of the piston 100.

The piston 100 may be similar to the piston 58 (FIG. 2a), except that the piston 100 includes a slot 110 and a shoulder 112 for holding the valve pin 82, instead of the pass-through 74 and the shoulder 76 (FIG. 2a).

The valve pin 82 and the actuator 84 may be removably connected to each other, by means of, for example, the optional retainer 86 which may be similar to the retainer 47 (FIG. 2a). By providing a removable connection between the valve pin 82 and the actuator 84, either one may be replaced without necessitating the replacement of the other.

The resistive wire 94 may extend from the valve pin 82 through the slot 110. The slot 110 is exposed in a chamber 114 that is sealed from the actuating fluid in the chamber 102. The resistive wire 94 is thus, sealed from the actuating fluid. The chamber 114 communicates with a conduit 116 which is defined in a mold plate 118. The mold plate 116 replaces the mold plate 30 (FIG. 2a) and mates with the mold plate 28 to form the mold cavities 32. The resistive wire 94 can be connected to the power source (not shown) through the conduit 116.

It will be appreciated that the passage of the resistive wire 94 from the valve pin 82 out from the gating system 80 to a power source can be accomplished in numerous ways, and that the above described structure is exemplary only.

In the position shown in FIG. 3, the second mold plate 30 is in the mold-closed position, ie. it is against the first mold plate 28. The valve pin 82 is in the closed position, and the slug 78 requires liquefying to permit melt flow into the mold cavity 32, analogous to the position of the valve pin 44 in the embodiment shown in FIG. 2d. However, in the position shown in FIG. 3, the heating element 92 in the valve pin 82 can be activated to liquefy the slug 78 faster than would be accomplished with the unheated valve pin 44 (FIG. 2d).

Figure 5:
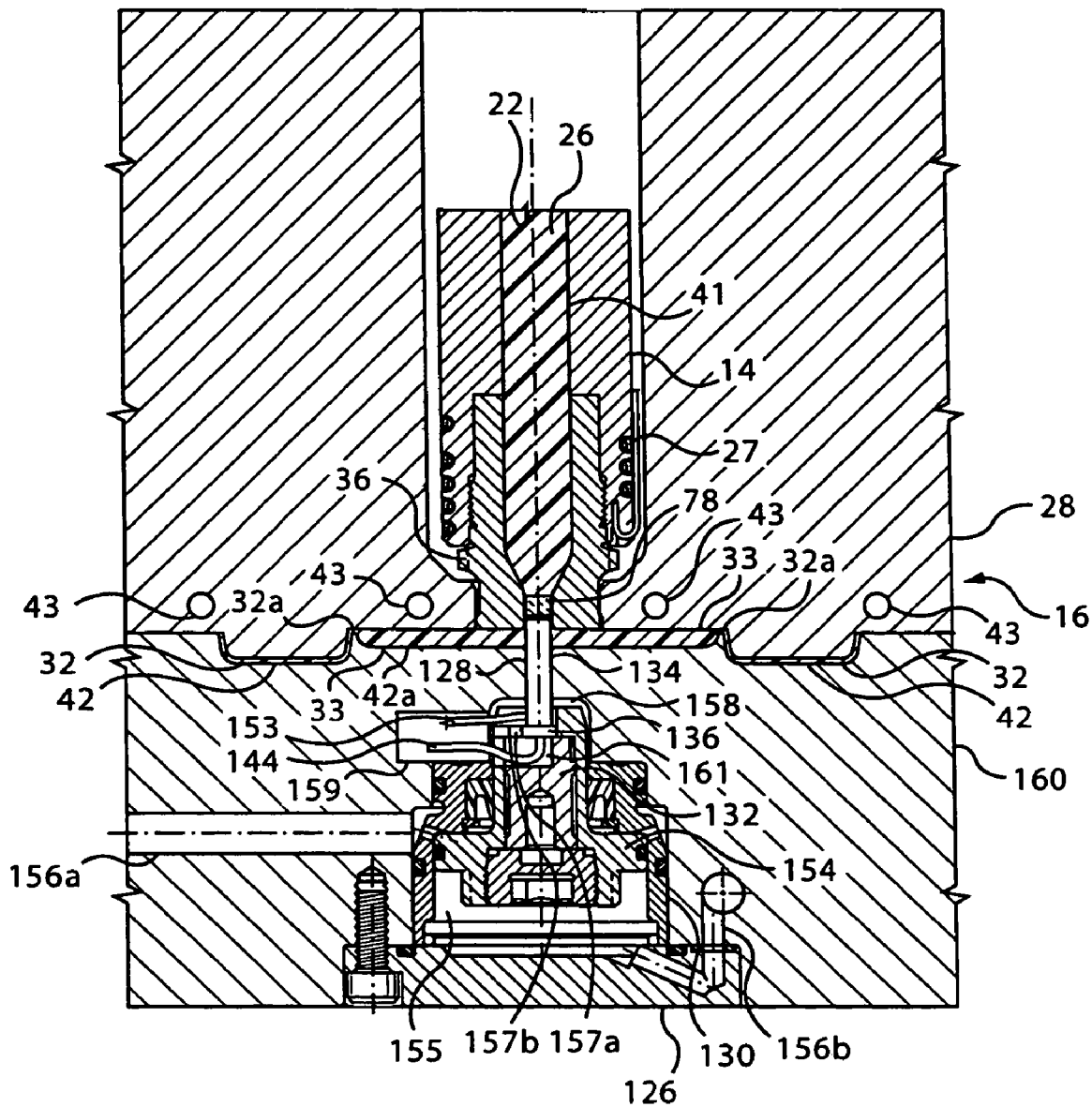
FIG. 5 is another alternative gating system for use with the present invention.

Reference is made to FIG. 5, which shows a gating system 126 which may be used with the present invention as an alternative to the gating systems 18 and 80 (FIGS. 2a and 3). The gating system 126 includes a valve pin 128, an actuator 130 and an optional retainer 132. The valve pin 128 may be cooled and may be heated, to reduce the time required for the slug 78 to solidify and the required for the slug 78 to melt.

Figure 6:
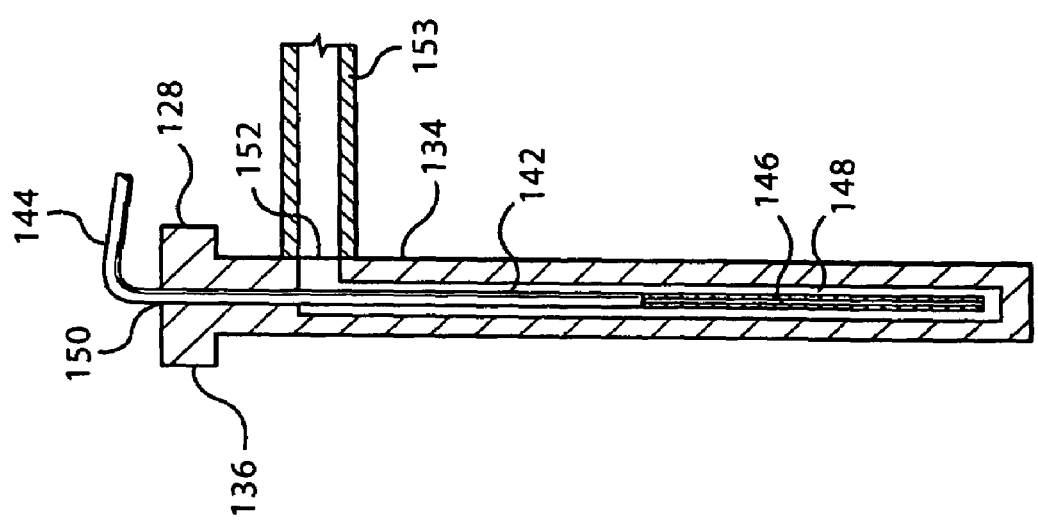
FIG. 6 is a sectional side view of a valve pin shown in FIG. 5.

Reference is made to FIG. 6. The valve pin 128 may have a construction similar to that shown in U. S. Pat. No. 5,071,340 (LaBianca). The valve pin 128 includes a valve pin body 134 and may optionally include a valve pin head 136.

The valve pin 128 includes a blind cavity 142 therein. The cavity 142 preferably extends substantially all the way to the end of the valve pin body 134. A conduit 144 is positioned in the cavity 142 to divide the cavity 142 into a first, inner passage 146 and a second, outer passage 148. The conduit 144 has an open end near the blind end of the cavity 142, connecting the inner and outer passages 146 and 148.

The conduit 144 may exit the valve pin 128 at 150. The exit point 150 may be positioned anywhere suitable on the valve pin 128, such as, for example, on the top face of the valve pin head 136.

An opening into the outer passage 148 from the outside of the valve pin is shown at 152. The opening 152 may be positioned anywhere suitable on the valve pin 128, such as, for example, near the junction between the valve pin body 134 and the valve pin head 136. The opening 152 may be connected to a conduit 153.

Referring to FIG. 5, the actuator 130 may be similar to the actuator 46, and may include a piston 154 that is movable in a chamber 155. A first fluid conduit 156a and a second fluid conduit 156b may be provided connecting a fluid pressure source (not shown) to the chamber 155 on either side of the piston 154.

The piston 154 may include a slot 157a and a shoulder 157b for receiving the valve pin 128 and which cooperate with the retainer 132 to hold the valve pin 128 in place. The slot 157a is exposed in the chamber 158 which is sealed from the chamber 155.

The conduit 153 extends from the valve pin 128 through the slot 157a and into a conduit 159 in a mold plate 160. The mold plate 160 replaces the mold plate 30 (FIG. 2a), and mates with the mold plate 28 to form the mold cavities 32.

The retainer 132 includes a slot 161, which may be aligned with the slot 156a, and which communicates with the conduit 159 in the mold plate 160. The conduit 144 extends from the valve pin 128 through the slot 161 and into the conduit 159. The conduits 144 and 153 may be connected to a fluid source (not shown) through the conduit 159.

When the valve pin 128 is in the closed position and it is desired to cool the melt 22 upstream from the valve pin 128 to form the slug 78, a coolant fluid may be circulated through the valve pin 128 through the conduits 144 and 153, in addition to circulating coolant through the cooling channels 43. The coolant fluid contributes to the cooling of the melt 22.upstream from the valve pin 128, reducing the time required to form the slug 78. As such, the configuration of the valve pin 128 and the conduits 144 and 153 form a cooling system for the valve pin 128.

It is optionally possible to circulate heating fluid through the valve pin 128. For example, when the mold cavity 24 is closed after the molded parts 42 are ejected, the valve pin 128 may be positioned adjacent the slug 78 and may be heated using the heating fluid, to help heat and melt the slug 78. As such, the configuration of the valve pin 128 and the conduits 144 and 153 form a valve pin heater for the valve pin 128. The valve pin heater may form the slug heater either alone or in conjunction with the nozzle heater 27 (FIGS. 2a–2d). As such, the valve pin heater is thermally connected to the slug 78 for heating and melting the slug 78.

Figure 7:
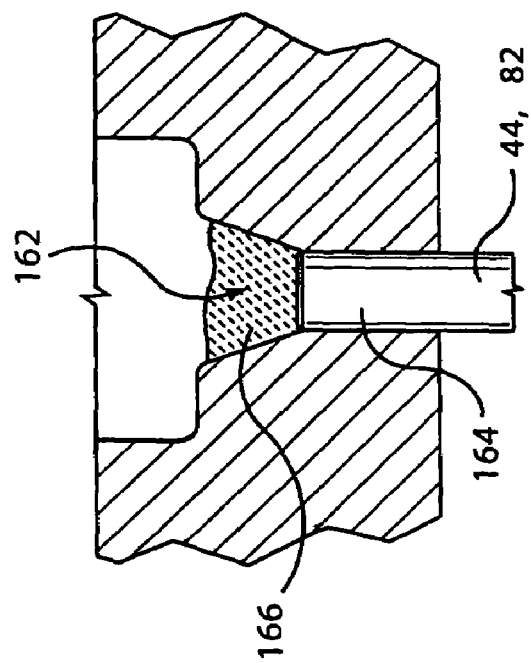
FIG. 7 is an alternative common inlet passage to that shown in FIGS. 2a–2d, for use with the present invention.

Reference is made to FIG. 7, which shows an alternative common inlet passage 162, which may be used with the present invention. The common inlet passage 162 may be similar to the common inlet portion 34 (FIG. 2a), except the common inlet passage 162 includes a valve pin sealing portion 164 and a slug formation portion 166. The valve pin sealing portion 164 is the portion of the common inlet passage 162 that cooperates with the tip of the valve pin 44 or 82, to seal against melt flow therepast, into the mold cavity 32. The valve pin sealing portion 164 may be cylindrical, or may alternatively be frustoconical for receiving a conical or frustoconical tip on a valve pin.

The slug formation portion 166 is positioned immediately upstream of the valve pin sealing portion 164 and is the portion of the common inlet passage 162 in which a slug 168 forms during the phase of the injection molding cycle shown in FIG. 7. The slug formation portion 166 is frustoconical. This configuration provides it with a smaller cross-sectional area at the downstream end, which is shown at 170, than at the upstream end which is shown at 172. Thus, the slug 168 that forms during the injection molding cycle is generally frustoconical, to reduce the risk of the slug 168 being pushed loose from the common inlet passage 162 as a result of melt pressure.

Reference is made to FIGS. 8a–8d, which illustrate phases of the injection molding cycle for an injection molding apparatus 174 in accordance with another embodiment of the present invention. The injection molding apparatus 174 may be similar to the injection molding apparatus 10 (FIG. 1), but includes a mold block 176 and a plurality of gating systems 178, instead of the mold block 16 and the gating systems 18 (FIG. 1).

The mold block 176 may be similar to the mold block 16 (FIG. 2a), except that the mold block 176 includes the first mold plate 28, a second mold plate 180, in which the gating systems 178 may be positioned, and a third mold plate 182, which encloses the gating systems 178 within the second mold plate 180. It is alternatively possible for the mold block 176 to have a different number of plates than those that are shown in FIGS. 8a–8d. The first, second and third mold plates 28, 180 and 182 are exemplary only. Any suitable configuration of plates may be used in order to provide the same functionality as is described below.

The gating systems 178 may be similar to the gating systems 18 (FIG. 2a), except that the gating systems 178 include the valve pin 44, the optional retainer 47, and a three-position actuator 184.

Figure 8A:
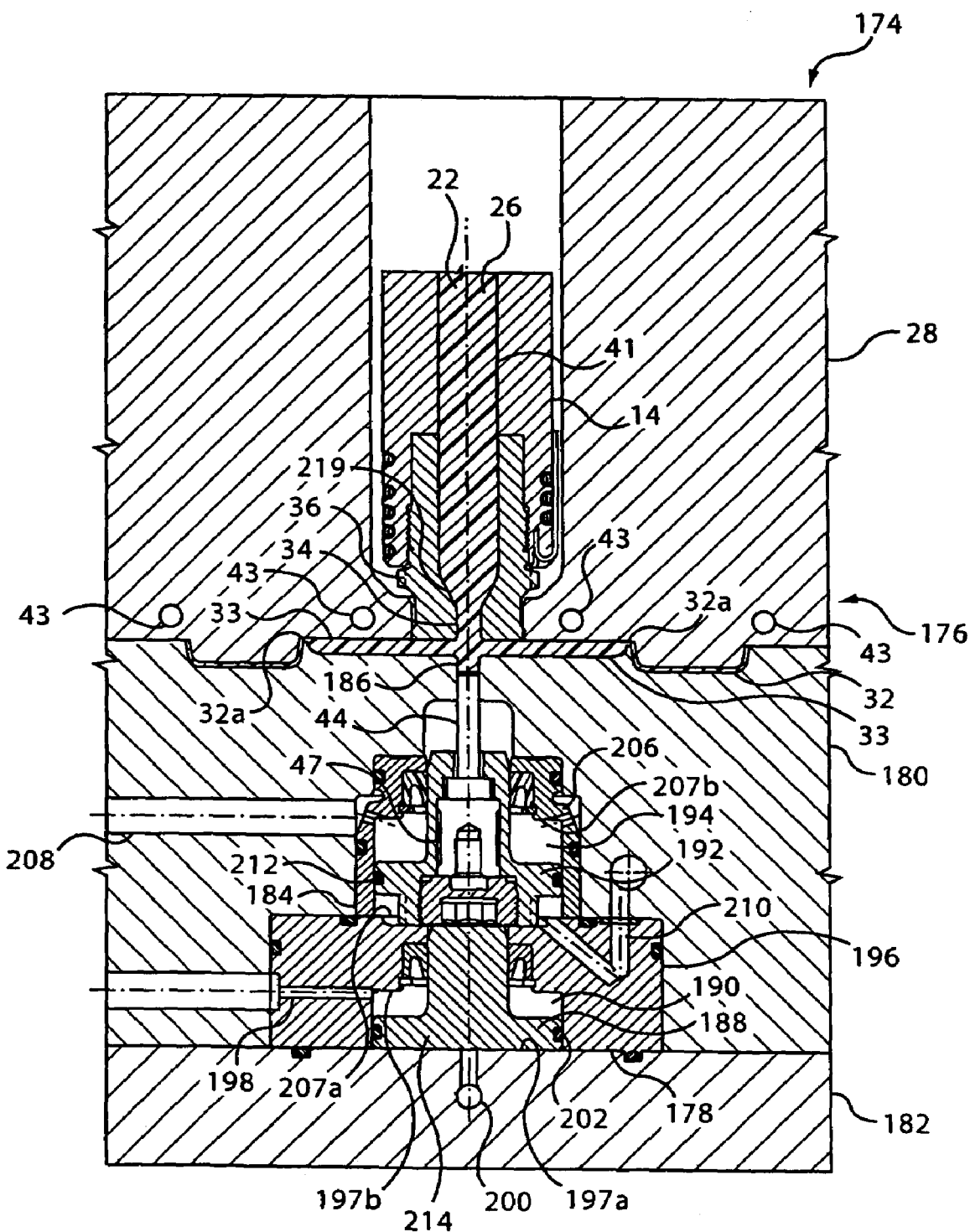
FIG. 8a is a magnified sectional side view of a gating system in accordance with an alternative embodiment of the present invention, having a valve pin in an open position.
Figure 8B:
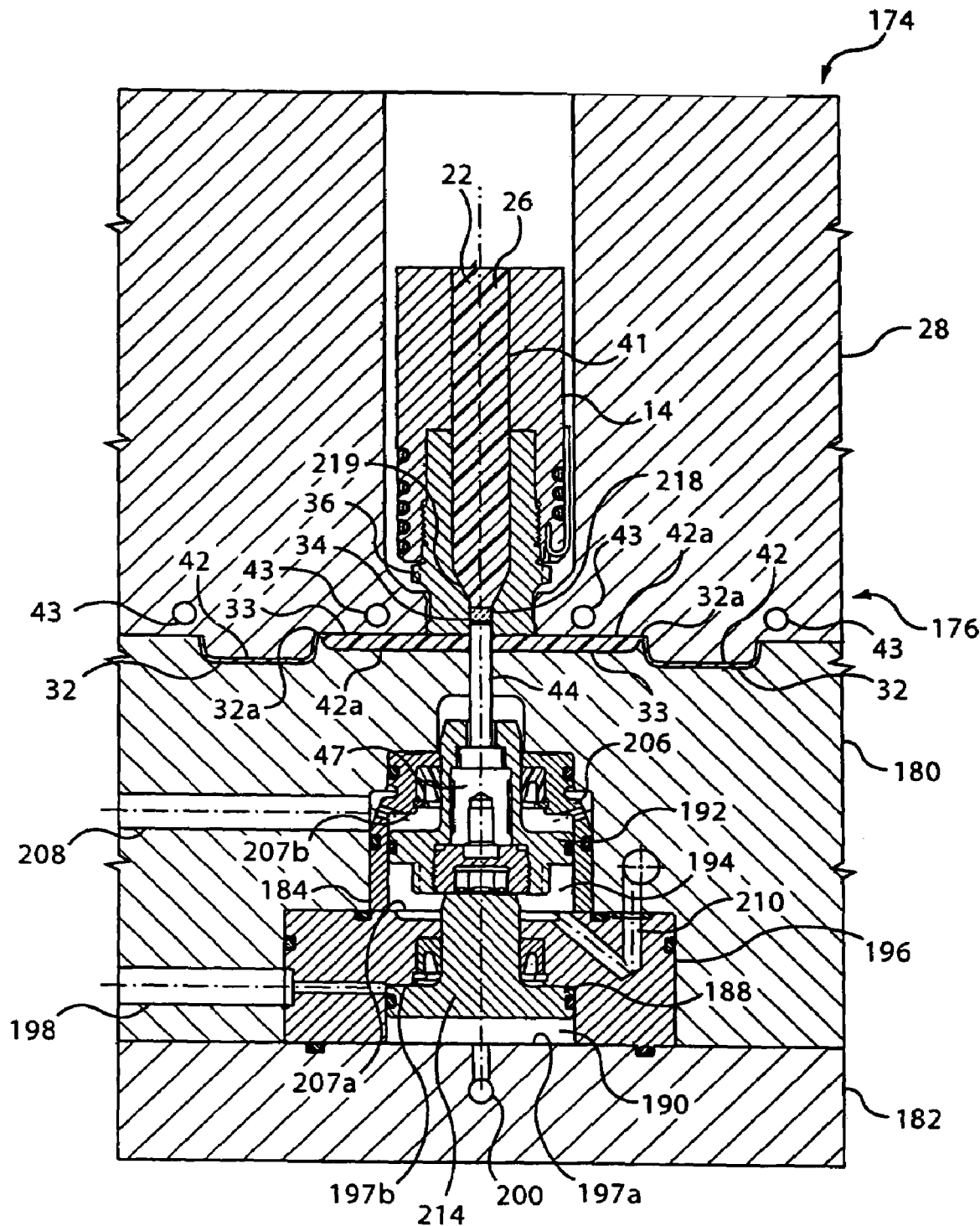
FIG. 8b is a sectional side view of the gating system shown in FIG. 8a, showing the valve pin in a closed position.
Figure 8C:
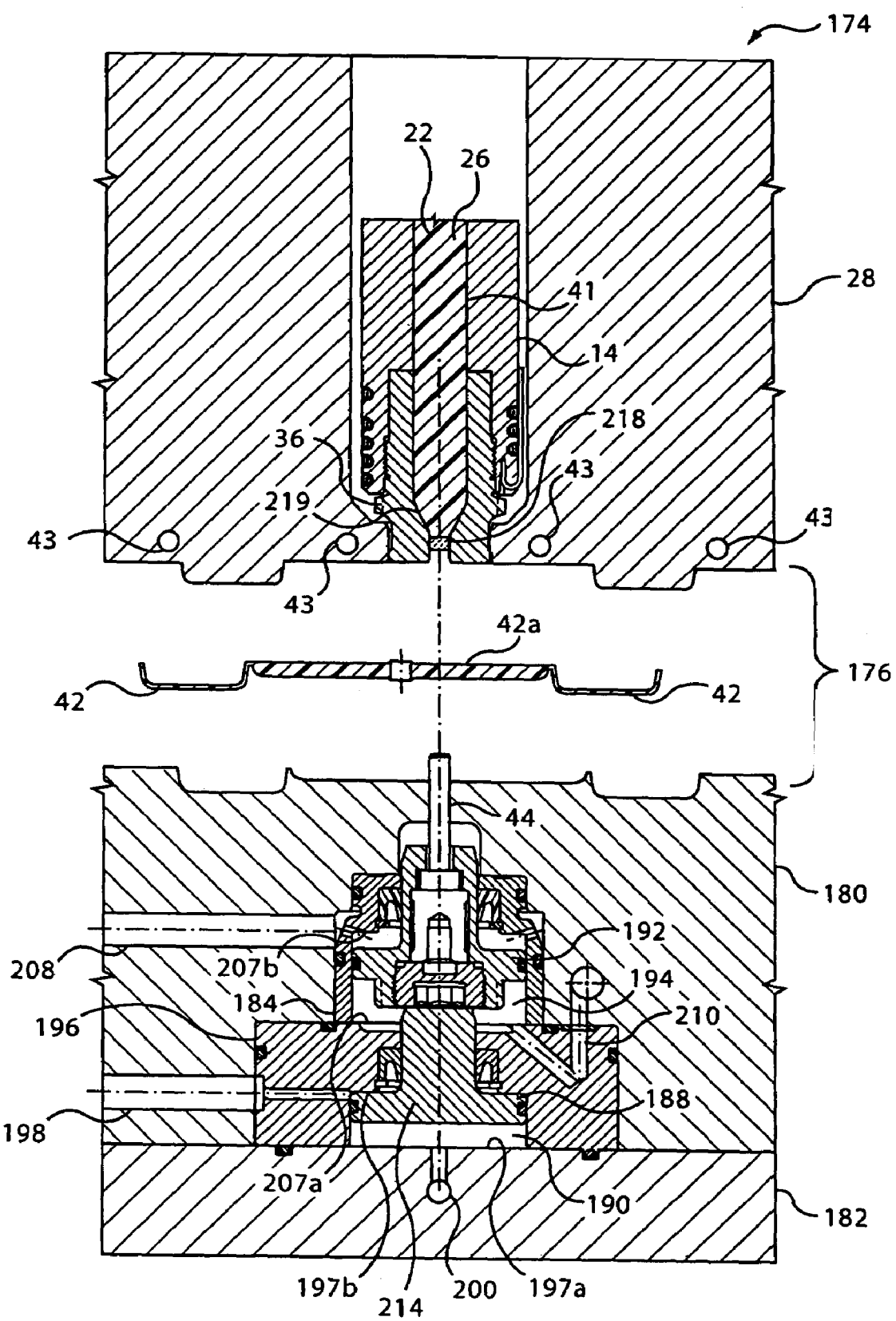
FIG. 8c is a sectional side view of the gating system shown in FIG. 8a, showing a mold plate in an ejection position.
Figure 8D:
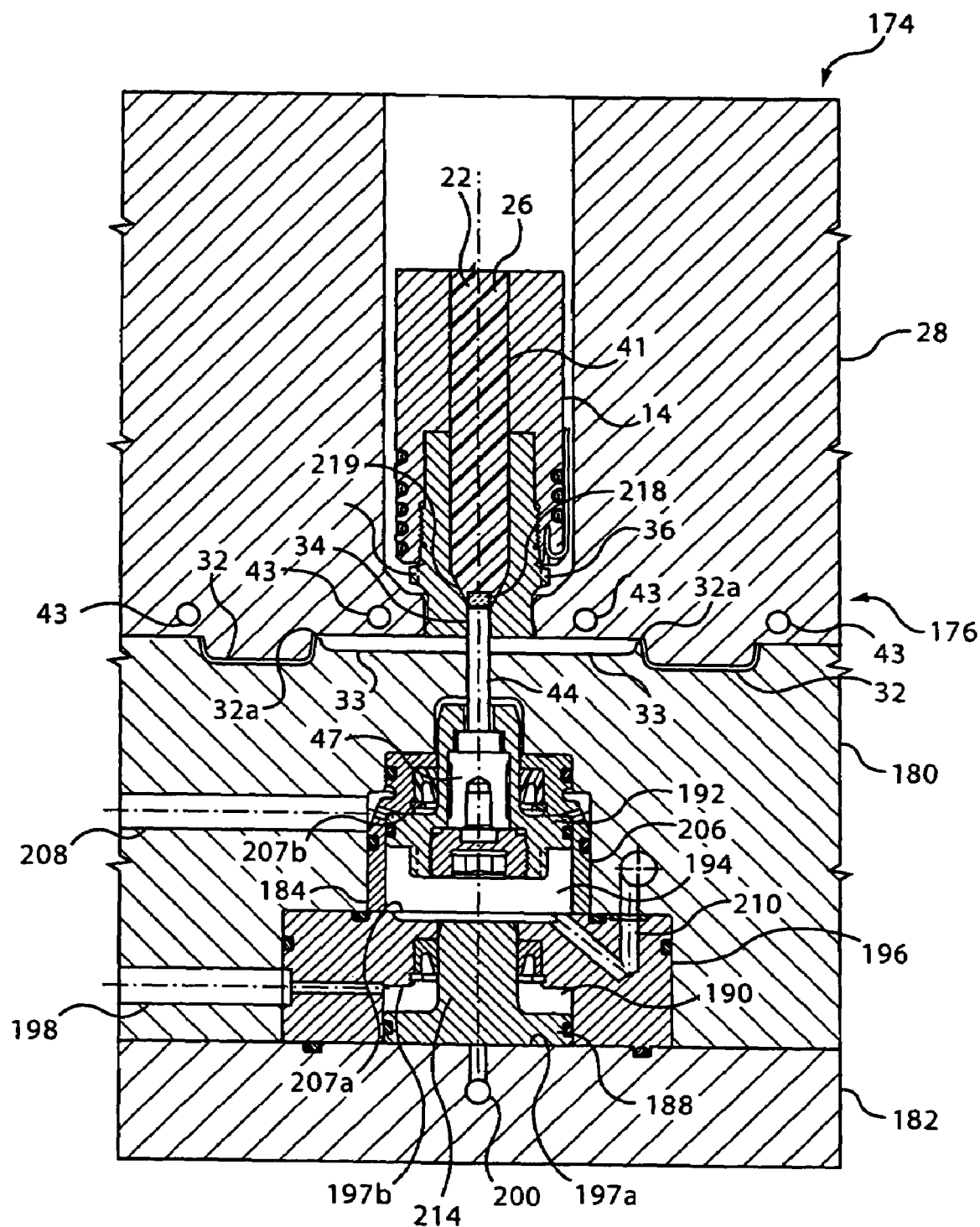
FIG. 8d is a sectional side view of the gating system shown in FIG. 8a, showing the mold plate in a mold-closed position.

The valve pin 44 may be movable in a valve pin channel 186 between an open position shown in FIG. 8a, a closed position shown in FIG. 8b, and a slug release position shown in FIG. 8d. The valve pin channel 186 may be defined in any suitable component of the injection molding apparatus 174. For example, the valve pin channel 186 may be defined in the second mold plate 180. The valve pin channel 186 cooperates with the valve pin 44 to prevent or at least inhibit the leakage of melt 22 therepast.

The three-position actuator 184 may be any suitable type of actuation system capable of moving between three positions. For example, the three-position actuator 184 may include a first piston 188, which is movable within a first chamber 190, and a second piston 192, which is movable within a second chamber 194. The first chamber 190 may be defined in part by a first chamber housing 196 positioned within the second mold plate 180, and in part by the third mold plate 182, which is attached to the second mold plate 180.

The first piston 188 is moved between a first end 197a and a second end 197b of the first chamber 1, by means of an actuating fluid, which may be, for example, air or hydraulic oil. A first fluid conduit 198 and a second fluid conduit 200 may be provided connecting a fluid pressure source (not shown) to the first chamber 190 on either side of the first piston 188. A seal 202 may be provided on the outer edge of the first piston 188 to prevent leakage of the actuation fluid between the first piston 188 and the first chamber housing 196.

The first and second ends 197a and 197b of the first chamber 190 correspond to the open and closed positions for the valve pin 44, as shown in FIGS. 8a and 8b.

The second piston 192 operatively connects the first piston 188 to the valve pin 44. The second chamber 194 may be defined in part by a second chamber housing 206 and in part by the first chamber 190.

The second piston 192 is moved between a first end 207a and a second end 207b of the second chamber 194, by means of an actuating fluid, which may be, for example, air or hydraulic oil. A third fluid conduit 208 and a fourth fluid conduit 210 may be provided connecting a fluid pressure source (not shown) to the second chamber 194 on either side of the second piston 192. A seal 212 may be provided on the outer edge of the second piston 192 to prevent leakage of the actuation fluid between the second piston 192 and the second chamber housing 206.

The first and second ends 207a and 207b of the second chamber 194 correspond to the open and slug release positions for the valve pin 44, as shown in FIGS. 8a and 8d. The closed position for the valve pin 44 (FIG. 8b) corresponds to a position somewhere between the first and second ends 207a and 207b in the second chamber 194.

An actuation arm 214 on the first piston 188 extends from the first chamber 190 into the second chamber 194. When the first piston 188 is moved to the second end 197b (FIG. 8b), the actuation arm 214 contacts and moves the second piston 192 towards the second end 207b, but not all the way thereto. In turn, the valve pin 44 is moved to the closed position.

When the first piston 188 is retracted back to the first end 197a of the first chamber 190 (FIG. 8a), melt pressure acting on the valve pin 44 can push the valve pin 44 back to the open position, and in turn, the second piston 192 can be moved to the first end 207a of the second chamber 194. Alternatively, or in addition, actuation fluid in the second chamber 194 can be used to push the second piston 192 to the first end 207a, and, in turn, to move the valve pin 44 back to the open position.

To move the valve pin 44 into the slug release position (FIG. 8d), the actuation fluid in the second chamber 194 is used to drive the second piston 192 to the second end 207a. The first piston 188 may remain in its retracted position during movement of the second piston 192.

The valve pin 44 and the second piston 192 may be removably connected to each other by means of, for example, the optional retainer 47.

The injection molding cycle is described as follows. In the open position, shown in FIG. 2a, the valve pin 44 is spaced from the gate and the first and second pistons 188 and 192 are retracted to the first ends 197a and 207a of the first and second chambers 190 and 194 respectively. The valve pin 44 may be retained in the open position until the mold cavity 32 is full.

Referring to FIG. 8b, when the mold cavity 32 is sufficiently packed with melt 22, the first piston 188 is moved to the second end 197b, driving the second piston 192 to its position between the first and second ends 207a and 207b, and, in turn, driving the valve pin 44 to its closed position. In the closed position, the valve pin 44 is positioned in the common inlet portion 34 and cooperates therewith to prevent melt flow into the mold cavities 32.

A flow of coolant may be initiated in the cooling channels 43, to cool and solidify the melt 22 in the mold cavities 32. The flow of coolant causes the melt 22 in the mold cavities 32 and in the gate passages 33, to cool and solidify to form the molded parts 42 and the extra solidified melt 42a. The coolant flow also causes a slug of melt 22, shown at 218 immediately upstream of the valve pin 44 to cool and solidify. The solidification of the slug 218 causes it to firmly attach to the common inlet portion 34. It will be noted that the movement of the valve pin 44 to the closed position may occur before or after the flow of coolant is initiated in the cooling channels 43.

Once the slug 218 has formed and the melt 22 inside the mold cavities 32 has solidified to form the molded parts 42, the second mold plate 180 is moved away from the first mold plate 28 into the ejection position as shown in FIG. 8c. Once the second mold plate 180 is in the ejection position, the molded parts 42 and the extra solidified melt 42a may be ejected from the mold cavities 32 and the gate passages 33. The molded parts 42 and the extra solidified melt 42a may drop from the mold cavities 32 into, for example, a collection vessel (not shown) or a conveyor (not shown). The molded parts 42 may be separated from the extra solidified melt 42a by any suitable means.

In the ejection position, shown in FIG. 8c, the valve pin 44 is spaced from the gate passages 33 however, the solidified slug 218 remains fixed in position in the common inlet portion 34 to prevents melt 22 from leaking therepast and drooling out of the common inlet portion 34. The valve pin 44 may be in the open position, the closed position or the slug release position when the second mold plate 180 is in the ejection position.

Once the molded parts 42 and the extra solidified melt 42a are ejected from the mold cavity 32, the second mold plate 180 is moved from the ejection position, shown in FIG. 8c back to the mold-closed position, shown in FIG. 8d.

The coolant flow in the cooling channels 43 is stopped, and the slug 218 is heated by the heater 27. The heating of the slug 218 causes it to liquefy. The second piston 192 is moved to the second end 207b of the second chamber 194 by means of the actuation fluid. This, in turn, drives the valve pin 44 to its slug release position, whereby the valve pin 44 drives the slug 218 out of the common inlet portion 34 into a slug release portion 219 of the melt flow passage 41 that is upstream from, and is preferably immediately upstream from the slug formation portion 166. In the slug release portion 219 of the melt flow passage 41 the cross-sectional area of the melt flow passage 41 is larger than that of the slug 218. Consequently, the slug 218 is exposed to hot melt on a greater portion of its surface area, relative to a slug that is retained in the slug formation portion 168. Thus, moving the slug 218 in this way liquefies the slug 218 more quickly than it can in the common inlet portion 34.

The valve pin 44 may be held in the closed position or in the slug release position to prevent melt 22 from entering the mold cavity 32 until the slug 218 is liquefied to a desired degree, such as, for example, substantially entirely liquefied. Once the slug 218 is liquefied as desired, the valve pin 44 is retracted into the open position, shown in FIG. 8a to permit melt 22 to flow into the mold cavities 32 for another injection molding cycle.

It will be noted that the common inlet passage 162, shown in FIG. 7, may be used with the embodiment shown in FIGS. 8a–8d. Furthermore, it may be advantageous to use common inlet passage 162 in this embodiment, because the frusto-conical slug that would form therein can be easier to dislodge by the valve pin 44, relative to a cylindrical slug, such as the slug 218.

By positioning the valve pin 44 outside the nozzle melt channel 26, the valve pin 44 is subject to reduced wear from the melt flow and thus has a longer operating life.

Figure 9:
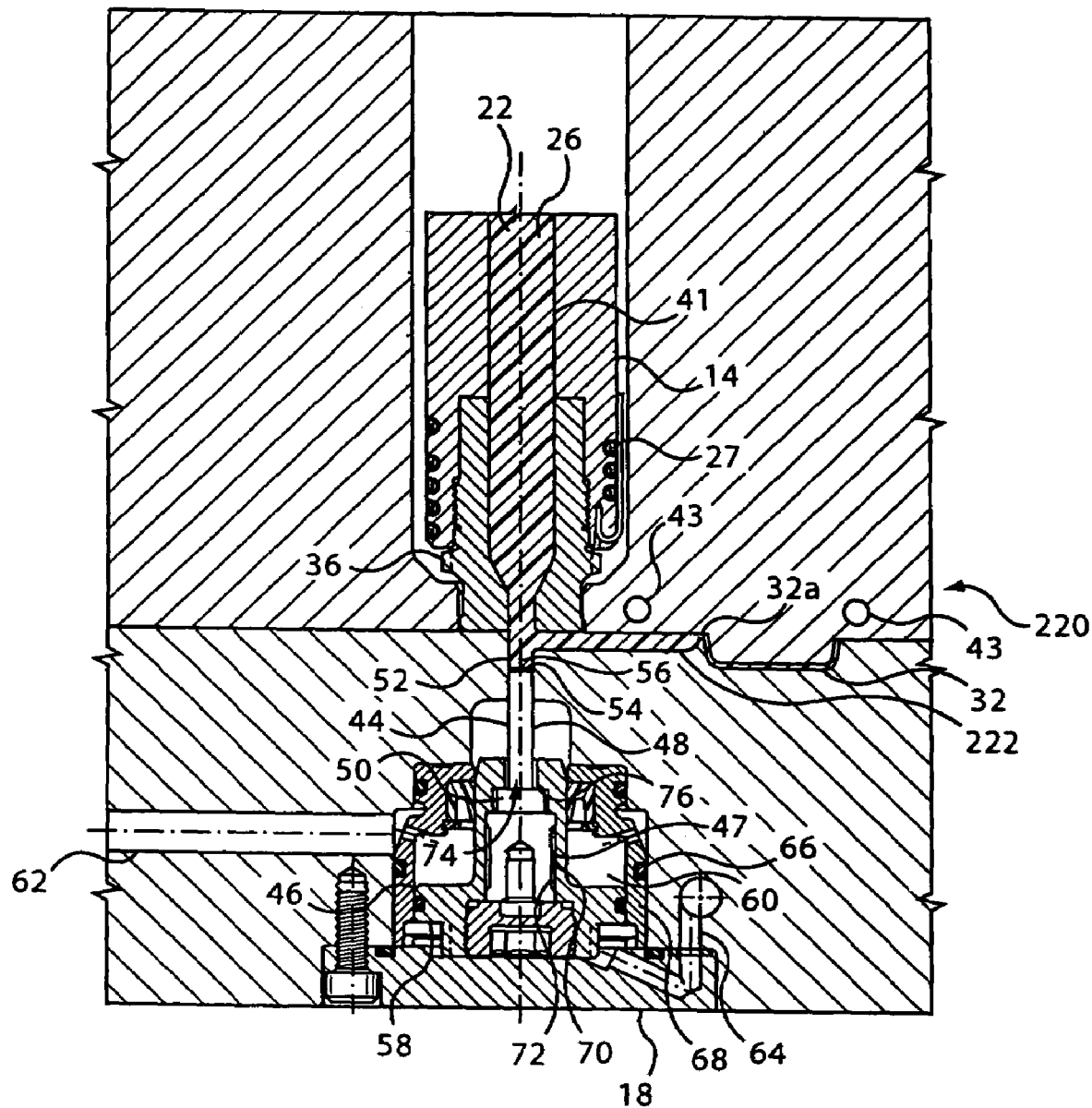
FIG. 9 is a sectional side view of an injection molding apparatus having a mold block that defines an alternative gate passage configuration, for use with the present invention.

Reference is made to FIG. 9, which shows a mold block 220 that can alternatively be used with the present invention. The mold block 220 may be similar to the mold blocks 16 and 178 (FIGS. 2a and 8a), however, the mold block 220 includes an individual gate passage 222 that extends to each mold cavity 32. The gate passages 222 do not share a common inlet passage, but instead individually extend from the mold block 220 to a mold cavity 32. The mold block 220 may otherwise function similarly to the mold blocks 16 and 176 (FIGS. 2a and 8a) for the purposes of this invention disclosure.

Figure 10A:
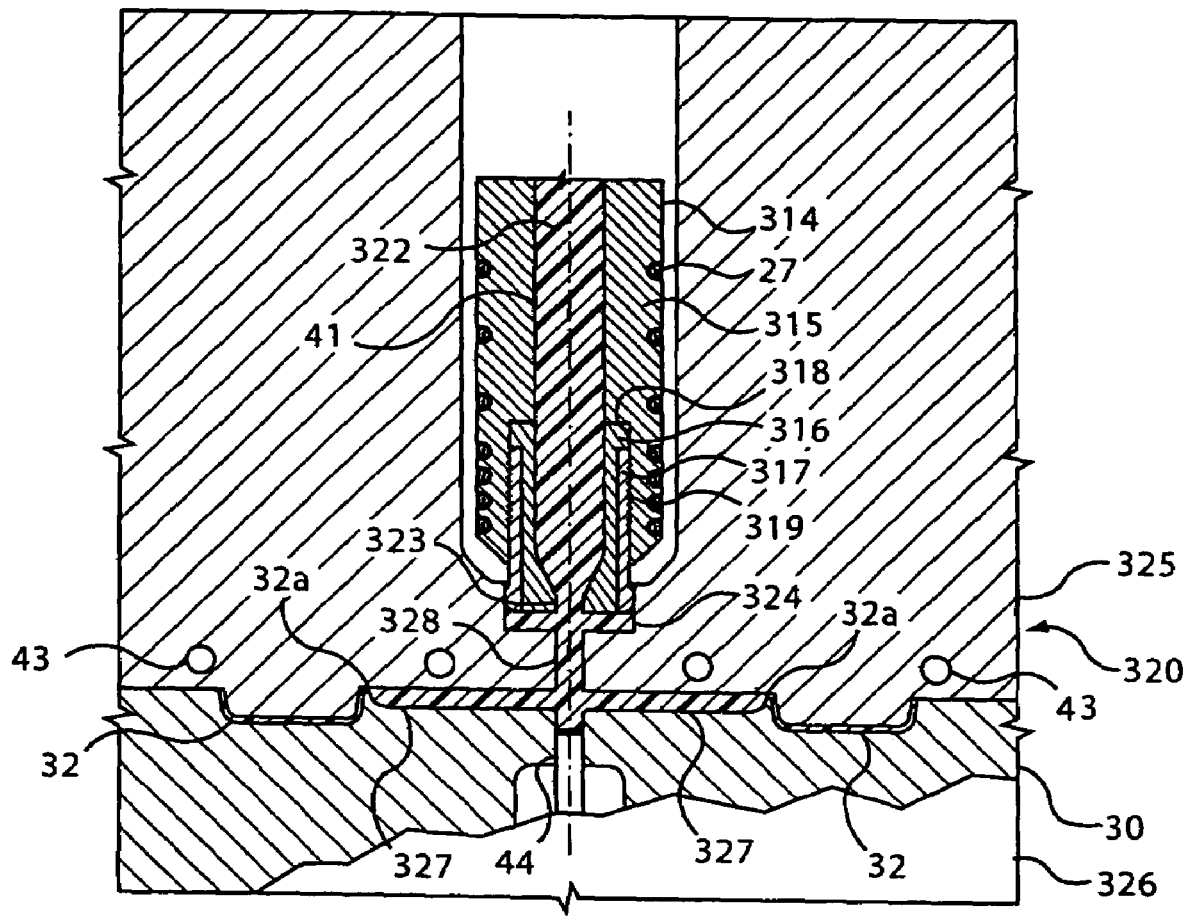
FIG. 10a is a magnified sectional side view of a gating system in accordance with another alternative embodiment of the present invention, having a valve pin in an open position.

Reference is made to FIG. 10a, which shows a nozzle 314 and a mold block 320 that can be used with the present invention. The nozzle 314 may be similar to the nozzle 14 (FIGS. 2a–2d) except that the nozzle 314 includes a nozzle body 315, a tip 316 and a tip retainer 317 at the end instead of having the gate insert 36 (FIGS. 2a–2d). The tip 316 may be received in a bore 318 in the nozzle body 315, and may be made from a material that is thermally conductive and/or wear resistant.

The tip retainer 317 may be removably connected to the nozzle body 315 by means of a threaded connection shown at 319. The tip retainer 317 retains the tip 316 in the bore 318. The tip retainer 317 may have a seal surface 321 for sealing against melt leakage between the nozzle 314 and the surrounding mold block 320. The tip retainer 317 may be made from a material that is thermally insulative to inhibit heat losses from the tip 316 into the mold block 320.

The nozzle 314 defines a nozzle melt channel 322 that has an outlet 323. A chamber 324 may exist between the nozzle 314 and the mold block 320. Among other things, the chamber 324 may permit some relative movement between the nozzle 314 and the mold block 320 as a result of thermal expansion and contraction during an injection molding operation. The chamber 324 may fill with melt during an injection molding operation. Melt 22 is prevented from escaping from the chamber by the seal formed between the tip retainer 317 and the mold block 320.

The mold block 320 may include a first mold plate 325 and a second mold plate 326. The mold plates 325 and 326 mate together to define a plurality of mold cavities 32. The mold cavities 32 are fed melt from a plurality of gate passages 327 which all include a common inlet portion 328. The common inlet portion 328 differs from the common inlet portion 34 (FIGS. 2a–2d) in that the common inlet portion 328 is positioned in a component that is separate from the nozzle 314. In the embodiment shown in FIG. 10, the common inlet portion 328 is a conduit that is formed directly in the first mold plate 325. It is alternatively possible, however, for the common inlet portion 328 to be formed in an insert that is removable from the mold plate 325, but that is separate from the nozzle 314.

Figure 10B:
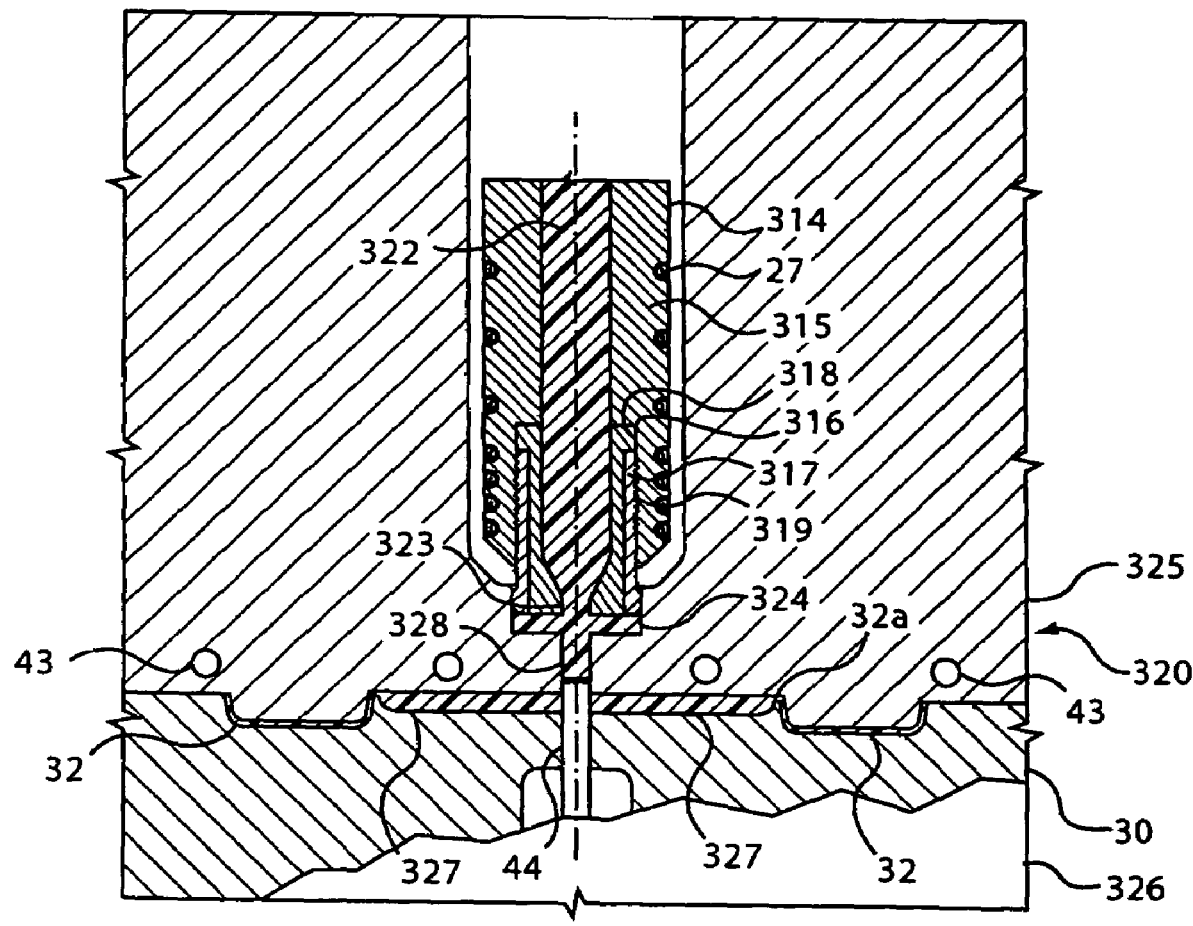
FIG. 10b is a sectional side view of the gating system shown in FIG. 10a, showing the valve pin in a closed position.

The valve pin 44 may be movable between an open position as shown in FIG. 10a and a closed position as shown in FIG. 10b. For simplicity, the actuation mechanism for the valve pin 44 is not shown in FIGS. 10a and 10b, however, the valve pin 44 may be operable in the same way as any of the valve pins shown in the embodiments described above.

Referring to FIG. 10b, when the valve pin 44 is in the closed position, the valve pin 44 extends into the common inlet portion 328. Melt 22 immediately upstream of the valve pin 44 may be solidified by any suitable means, eg, from the cooling of the mold block 320 and/or a cooling of the valve pin 44 if such cooling is provided. Melt 22 in the chamber 324 may also solidify from the cooling. The solidified melt 22 constitutes a slug (not shown).

After the slug is formed, the mold plates 325 and 326 may be separated and the molded parts (not shown) may be ejected in a manner similar to that described for any of the embodiments above. Once the molded parts have been ejected, the mold plates 325 and 326 may be mated together for another cycle.

The nozzle 314 feeds a plurality of mold cavities 32 in the embodiment shown in FIGS. 10a and 10b. It is alternatively possible for the nozzle 314 to feed a single mold cavity 32, similar to the embodiment shown in FIG. 9, while still having a separate tip 316 that is not part of a gate insert.

It has been described for the nozzles 14 to be heated by means of the manifold heater 12a. In this situation, the manifold heater 12a may be configured to heat a solidified slug, and may thus be comprised as part of, or all of the slug heater.

In each of the embodiments described, a slug is formed in the gate passage upstream of the valve pin, such as, for example, in the common inlet passage. It is alternatively possible for the slug to be formed outside the common inlet passage itself. For example, the slug may be formed further upstream, in the nozzle melt channel. The slug may be formed anywhere in the nozzle melt passage 41.

The system of the present invention permits, among other things, the nozzle to have a nozzle melt channel and a nozzle heater that are both concentric about a common axis and yet still keep the valve pin substantially outside the melt flow. This provides a more uniform temperature distribution for the melt along a transverse cross-section of the melt channel, which can improve the quality of the molded parts.

Particular examples of an injection molding apparatus are shown in the Figures. It will be appreciated that the injection molding apparatus that incorporates the gating system of the present invention may be any suitable type of injection molding apparatus and is not limited to the examples shown.

While the above description constitutes the preferred embodiments, it will be appreciated that the present invention is susceptible to modification and change without departing from the fair meaning of the accompanying claims.

The invention claimed is:

1. A method for controlling melt flow in an injection molding apparatus, the injection molding apparatus including a mold block defining a mold cavity and at least partially defining a gate passage to the mold cavity, a manifold and at least one nozzle defining a nozzle melt channel for transferring melt from a melt source to the gate passage, the method comprising:

providing a valve pin at the gate passage that is in an open position such that the valve pin is at least partially removed from the gate passage to permit melt flow through the gate passage, wherein the valve pin is positioned outside the nozzle melt channel in the open position;

moving the valve pin to a closed position such that the valve pin enters the nozzle melt channel to stop the melt flow to the gate passage;

solidifying melt immediately upstream of the valve pin to form a slug to create a seal between the melt source and the gate passage; and removing the valve pin from the nozzle melt channel to return the valve pin to the open position leaving the slug to seal between the melt source and the gate passage.

2. A method as claimed in claim 1, wherein the mold block includes a first mold plate and a second mold plate, and the first and second mold plates together define the mold cavity, and the method further comprises the steps of:

positioning the first and second mold plates in an ejection position after forming the seal between the melt source and the gate passage, wherein in the ejection position the first and second mold plates are separated sufficiently for the ejection of the molded part from the mold cavity; and ejecting the molded part from the mold cavity.

3. A method as claimed in claim 2, further comprising the steps of:

positioning the first and second mold plates in a mold-closed position after ejecting the molded part from the mold cavity, wherein in the mold-closed position the first and second mold plates mate together to define the mold cavity; and heating the slug to liquefy the slug sufficiently to permit melt to flow into the gate passage and into the mold cavity.

4. A method as claimed in claim 2, further comprising:

positioning the first and second mold plates in a mold-closed position after ejecting the molded part from the mold cavity, wherein in the mold-closed position the first and second mold plates mate together to define the mold cavity;

moving the valve pin to dislodge the slug from the nozzle melt channel; and heating the slug to liquefy the slug sufficiently to permit melt to flow into the gate passage and into the mold cavity upon removal of the valve pin from the nozzle melt channel.

5. A method as claimed in claim 1, wherein the mold block includes a plurality of mold cavities and a plurality of gate passages thereto, and wherein the plurality of gate passages are in fluid communication with the nozzle melt channel via a common inlet portion, and wherein in the closed position the valve pin cooperates with the common inlet portion to prevent melt flow into the plurality of mold cavities.

6. A method for controlling melt flow in an injection molding apparatus, the injection molding apparatus including a mold block defining a mold cavity and at least partially defining a gate passage to the mold cavity, a manifold and at least one nozzle defining a nozzle melt channel for transferring melt from a melt source to the gate passage, the method comprising:

providing a valve pin at the gate passage in an open position such that the valve pin is at least partially removed from the gate passage to permit melt flow from the nozzle melt channel through the gate passage to the mold cavity;

moving the valve pin to a closed position, wherein the valve pin cooperates with the gate passage to prevent melt flow to the mold cavity, wherein the valve pin is positioned outside the nozzle melt channel in both the open and closed positions;

solidifying melt immediately upstream of the valve pin to form a slug to create a seal between the melt source and the gate passage, wherein the sealing slug is positioned outside the nozzle melt channel; and returning the valve pin to the open position after forming the seal between the melt source and the gate passage.

7. The method of claim 6, wherein the mold block includes a first mold plate and a second mold plate, and the first and second mold plates together define the mold cavity in a mold-closed position, the method further comprising:

positioning the first and second mold plates in the mold-closed position after ejecting the molded part from the mold cavity; and heating the slug to liquefy the slug sufficiently to permit melt to flow into the gate passage and into the mold cavity.

8. The method of claim 7, further comprising:

using the valve pin to dislodge the slug from the nozzle melt channel and removing the valve pin from the nozzle melt channel prior to liquefying the slug sufficiently to permit melt to flow into the gate passage and into the mold cavity.

* * * * *